US009976615B2

(12) United States Patent
Patil et al.

(10) Patent No.: US 9,976,615 B2
(45) Date of Patent: May 22, 2018

(54) FLOATING HOUSING FORCE TRANSMITTING ASSEMBLY

(71) Applicant: Eaton Corporation, Cleveland, OH (US)

(72) Inventors: Yogesh Bhanudas Patil, Pune (IN); Daniel Eino Wepplo, Lakewood, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 223 days.

(21) Appl. No.: 14/799,827

(22) Filed: Jul. 15, 2015

(65) Prior Publication Data
US 2017/0016487 A1 Jan. 19, 2017

(51) Int. Cl.
| | | |
|---|---|---|
| *F16D 55/00* | (2006.01) | |
| *F16D 55/227* | (2006.01) | |
| *F16D 65/18* | (2006.01) | |
| *F16D 25/0635* | (2006.01) | |
| *F16D 25/08* | (2006.01) | |
| *F16D 59/02* | (2006.01) | |
| *F16D 121/06* | (2012.01) | |

(52) U.S. Cl.
CPC ........ F16D 65/186 (2013.01); *F16D 25/0635* (2013.01); *F16D 25/082* (2013.01); *F16D 55/227* (2013.01); *F16D 59/02* (2013.01); *F16D 2055/0058* (2013.01); *F16D 2121/06* (2013.01)

(58) Field of Classification Search
None
See application file for complete search history.

(56) References Cited

U.S. PATENT DOCUMENTS

| | | | | |
|---|---|---|---|---|
| 5,467,848 A | * | 11/1995 | Knez | ...... F16D 55/227 188/73.31 |
| 6,206,149 B1 | * | 3/2001 | Heidenreich | ....... F16D 55/2245 188/1.11 W |
| 8,800,726 B2 | | 8/2014 | Achrekar | |
| 8,813,936 B2 | | 8/2014 | Szpak | |

(Continued)

*Primary Examiner* — Robert W Hodge
*Assistant Examiner* — Ryan P Dodd
(74) *Attorney, Agent, or Firm* — Daniel S. Kalka

(57) ABSTRACT

A force transmitting assembly includes a mounting flange having a central opening to receive a shaft, wherein the mounting flange is mountable on a frame, a rotor disc mountable on the shaft and rotatable with the shaft, the rotor disc having a first planar face and a second planar face, a float plate having a first friction surface engageable with the first planar face, and a pressure plate having a second friction surface engageable with the second planar face. The brake assembly also includes a spring housing, which operates as a piston, and a cylinder coupled to the spring housing to form a fluid pressure chamber, wherein the spring housing moves in a first direction when pressurized fluid enters the fluid pressure chamber and the spring housing moves in a second direction when pressurized fluid exits the fluid pressure chamber. The assembly further includes a plurality of nested tube subassemblies supporting the float plate, the pressure plate, and the spring housing to allow axial movement of at least one of the float plate, the pressure plate, and the spring housing. The nested tube subassemblies also transmit torque from the rotor to the mounting flange during the engaged condition of the brake assembly.

9 Claims, 4 Drawing Sheets

(56) References Cited

U.S. PATENT DOCUMENTS

| | | | |
|---|---|---|---|
| 8,919,514 B2 | 12/2014 | More | |
| 2004/0188191 A1* | 9/2004 | Lintner | F16D 55/22655 |
| | | | 188/73.45 |
| 2013/0199879 A1* | 8/2013 | Thompson | F16D 65/095 |
| | | | 188/73.44 |
| 2015/0122598 A1* | 5/2015 | Lethorn | F16D 65/0087 |
| | | | 188/73.45 |
| 2015/0323022 A1* | 11/2015 | Thomas | F16D 55/227 |
| | | | 188/73.45 |

* cited by examiner

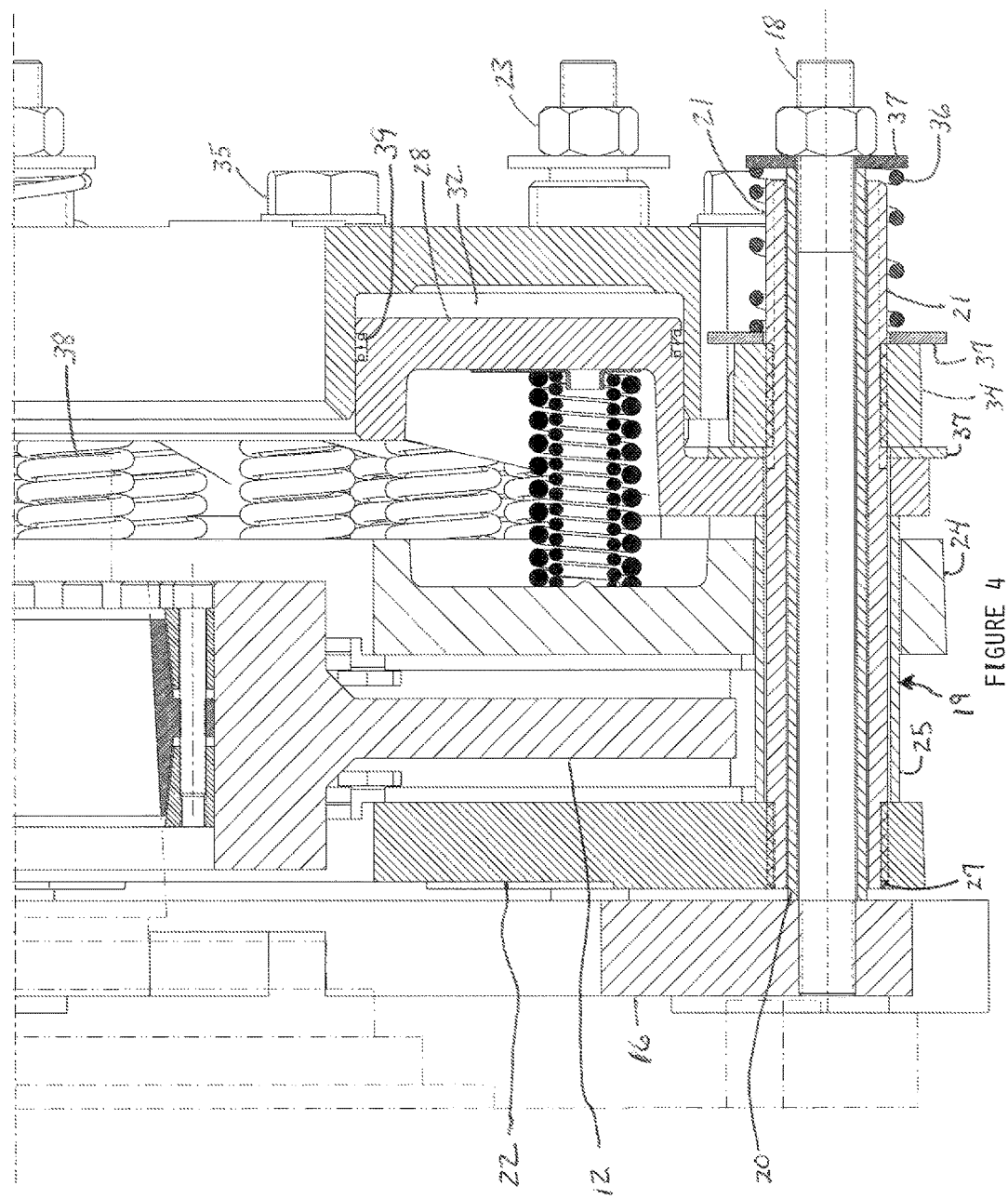

FLOATING HOUSING FORCE TRANSMITTING ASSEMBLY

TECHNICAL FIELD

The present teachings relate to a force transmitting assembly, such as a brake or a clutch, and more particularly to such an assembly with floating components.

BACKGROUND

The term "assembly" as used in this disclosure refers to an assembly, such as a brake assembly, that can function as a brake, a clutch, and/or both. While the assembly described herein is particularly suited for use as a brake assembly and will be discussed primarily in the braking context, those of ordinary skill in the art will understand that the assembly is equally capable of functioning as a clutch. For simplicity, the term "assembly" will primarily be used, but the term "assembly," "force transmitting assembly," "brake assembly," and "clutch assembly" are all interchangeable in the description below.

Known force transmitting assemblies have been connected with a shaft to control power transmission. These known assemblies have been used in various applications, such as draglines, power shovels, conveyors, shears, power presses, and other machines.

Typical assemblies include one or more rotor discs that rotate on a shaft. Braking occurs when friction linings attached to plates on either side of the rotor disc clamp down onto the rotor disc. The engagement between the rotor disc faces and the friction linings creates braking action, slowing and eventually stopping rotation of the rotor disc. Pressure may be applied using a spring set within the assembly. These assemblies attach the rotor disc and shaft together via a splined coupling to allow axial movement of the rotor disc during an engagement operation. However, splined couplings experience high wear, regardless of how often it is engaged, from the continuous forces applied to the splines.

There is a desire for an assembly that minimizes wear within the assembly without sacrificing performance. It is further desirable to provide an assembly with a reduced envelope size, reduced overall weight, and lower cost of assembly yet maintaining the same functionality as a larger sized assembly for use in a wide variety of applications, like mining applications.

SUMMARY

A force transmitting assembly includes a mounting flange having a central opening to receive a shaft, wherein the mounting flange is mountable on a frame, a rotor disc constructed for mounting on the shaft and for rotation with the shaft, the rotor disc having a first planar face and a second planar face, a float plate having a first friction surface engageable with the first planar face, and a pressure plate having a second friction surface engageable with the second planar face. The assembly also includes a spring housing which functions as a piston, and a cylinder coupled to the spring housing to form a fluid pressure chamber, wherein the spring housing moves in a first direction when pressurized fluid enters the fluid pressure chamber and the spring housing moves in a second direction when pressurized fluid exits the fluid pressure chamber. The assembly further includes a plurality of nested tube subassemblies supporting the float plate, the pressure plate, and the spring housing to allow axial movement of at least one of the float plate, the pressure plate, and the spring housing.

BRIEF DESCRIPTION OF THE DRAWINGS

FIG. 4 is a schematic view of an enlarged portion of the assembly of FIG. 1 in an engaged condition.

DETAILED DESCRIPTION

Figure 1:
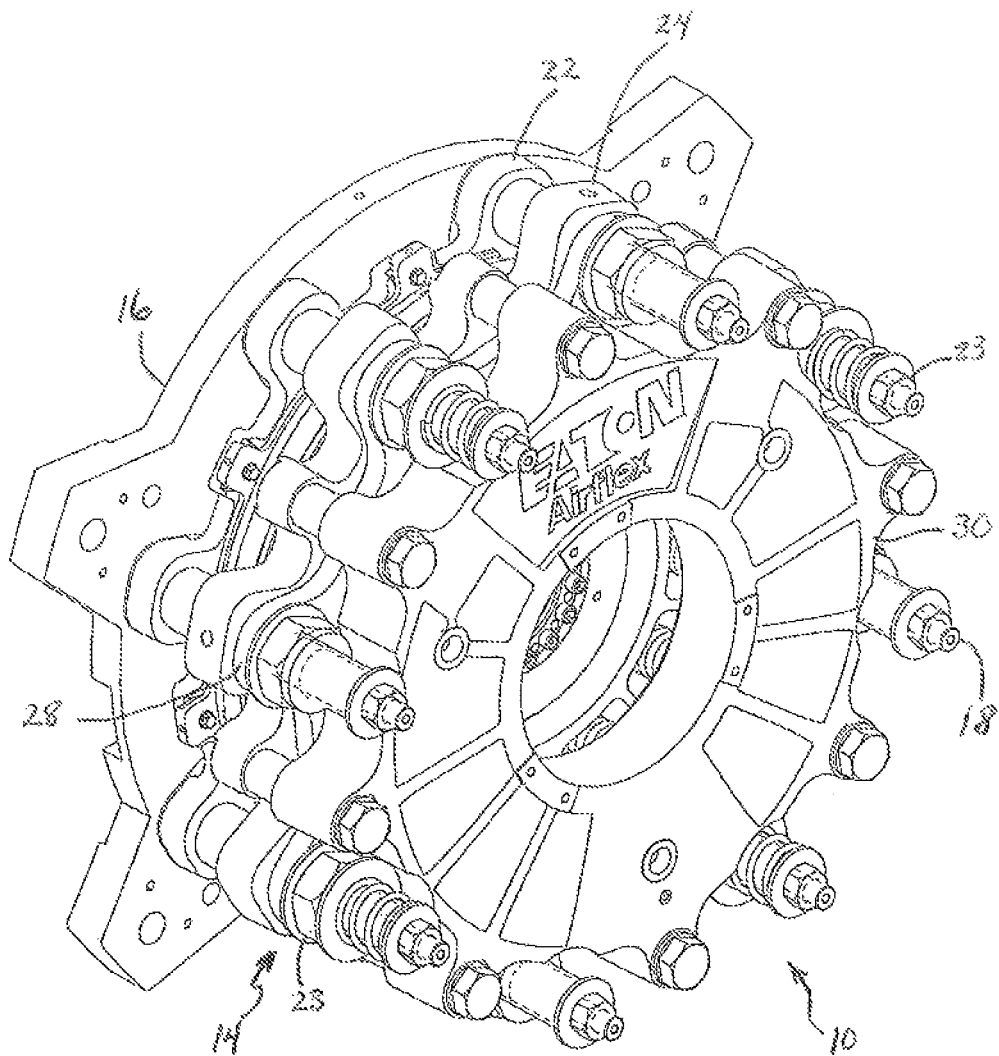
FIG. 1 is a perspective view of a force transmitting assembly according to one aspect of the teachings.

FIGS. 1 through 4 illustrate a force transmitting assembly, such as a brake assembly 10, according to one aspect of the present teachings. The assembly 10 includes a rotor disc 12 having a first planar face and a second planar face on each side, which can be driven by a motor (not shown), and a housing 14. The rotor disc 12 may be fixed on a motor shaft 15 in any known manner; in the illustrated example, the motor shaft 15 is a tapered shaft, and the rotor disc 12 is rigidly attached to the motor shaft 15 via a wedge-action coupling 15a. The assembly 10 of the present disclosure may be used with any shaft lock assembly tapered or straight.

The housing 14 can include a mounting flange 16 adapted to be mounted on a customer part 17, such as a motor frame (when the assembly 10 is used as a brake) or a driven shaft (when the assembly 10 is used as a clutch). In one aspect of the teachings, the mounting flange 16, as well as other portions of the housing 14, are mounted with a plurality of studs 18 arranged in a circular array. As will be explained in greater detail below, the studs 18 act as rigid supports are disposed within a plurality of nested tube subassemblies 19 that include guide tubes 20 thereon followed by sliding hollow studs 21 on the guide tubes 20, and then spacer clamp tubes 25 disposed on a portion of the hollow studs 21 to guide and assist in transmitting the axial movement and required forces of the other components of the housing 14. Each nested tube subassembly 19 includes the stud 18, the guide tube 20 thereon, and the sliding hollow stud 21 on the guide tube. Fasteners, such as nuts 23 may be disposed on the studs 18 to hold the assembly 10 together. The torque in this assembly 10 is transferred through the nested tube subassemblies 19 of the studs 18, guide tubes 20, hollow studs 21, and spacer clamp tubes 25. The nested tube subassemblies 19 also transmit torque from the rotor disc 12 to the mounting flange 16 during an engaged condition of the brake assembly 10. The sliding hollow studs 21 transmit axial forces and torque during braking and clutching in a manner unlike those of other previous assemblies.

The housing 14 includes a float plate 22 and a pressure plate 24 disposed on opposite sides of the rotor disc 12. The float plate 22 and pressure plate 24 are both slidingly supported by the nested tube subassemblies 19 so they are axially movable thereon. Friction linings 26a, 26b are disposed on the float plate 22 and the pressure plate 24, respectively, on either side of the rotor disc 12. The friction linings 26a, 26b may be fastened in any known manner such as with fasteners. The friction linings 26a, 26b may be made of any appropriate friction material normally used in brake or clutch assemblies. The friction linings 26a, 26b are designed to frictionally engage with the rotor disc 12 to retard rotation of the rotor disc 12. In one aspect of the teachings, the friction linings 26a, 26b may be divided into wedge-shaped segments to allow easy removal of the friction linings 26a, 26b without disassembling the entire assembly 10.

The assembly 10 can include a spring housing 28 and a cylinder 30. The spring housing 28 cooperates with the cylinder 30 and operates as a piston. The spring housing 28 and the cylinder 30 together form a fluid pressure chamber 32 with a port (not shown) that allows fluid, such as air or hydraulic fluid, to enter and exit the fluid chamber 32. A bolt 35 may connect the cylinder 30 to the pressure plate 24 so that there is no relative movement between the cylinder 30 and the pressure plate 24. Connecting the cylinder 30 with the pressure plate 24 prevents relative axial movement between the two members. Threaded hollow studs 21 are attached at one end to the float plate 22 with a threaded joint 27 and by way of fasteners 34, like self-locking nuts, to retain the spring housing 28 on one side and with the assistance of the spacer clamp tubes 25 on the other side. The hollow studs 21 provide a rigid connection between the float plate 22 and the spring housing 28 to ensure that the float plate 22 and the spring housing 28 do not move relative to one another. As a result, the float plate 22 and the spring housing 28 move together as a single unit. The nested tube subassemblies 19 of the studs 18, guide tubes 20, hollow studs 21, and spacer clamp tubes 25 create a large bearing area that provides better support to the floating parts (e.g., the float plate 22, pressure plate 24, and spring housing 28) than previous assembly designs with the advantage of a smaller package or envelope size, reduction in overall weight, and assembly cost. When the assembly 10 goes from an engaged to a disengaged condition, the pressure plate 24 slides or floats on the spacer clamp tubes 25 that are locked in position between the float plate 22 and the spring housing 28. The float plate 22 and the spring housing 28 are move together with the sliding hollow studs 21 which float on the guide tubes 20. Manufacturing the guide tubes 20 of an aluminum bronze, nickel aluminum bronze, or like material may reduce friction and power loss during movement. The hollow studs 21 material may be made of nickel aluminum bronze or may differ as per the application need for metals of differing strengths. Any high strength low wear friction coefficient material may be used for the hollow studs 21.

A release spring 36 can be disposed on the other end of the hollow studs 21 (the end not attached to the float plate 22) between washers 37 located between the nuts 34 threaded on hollow studs 21 and nuts 23 at the end of the studs 18. When the brake assembly is in the released or disengaged position, the float plate 22 moves to the left away from the rotor disc 12. Nuts 34 threaded on the hollow studs 21 on one side of the spring housing 28 and spacer clamp tubes 25 on the other side of the spring housing 28 together urge the float plate 22 to move to the left away from the rotor disc 12 simultaneously the pressure plate 24 is caused to move away from the rotor disc 12 in the opposite direction (to the right). One or more seals 39 may be disposed on the spring housing 28 to form a fluid-tight seal between the spring housing 28 and the cylinder 30. A plurality of compression springs 38 in spring housing 28 which may consist of inner and outer springs are disposed between the pressure plate 24 and the spring housing 28 to bias the pressure plate 24 and spring housing 28 away from each other.

The release spring 36 is biased to push the float plate 22 away from the rotor disc 12 during a release operation. More particularly, when the release spring 36 pushes against the spring housing 28 toward the left, the float plate 22 moves to the left away from the rotor disc 12.

Previous brake assemblies operate by moving a rotor disc axially during braking action, leaving the housing of the assembly stationary. The assembly 10 shown in FIGS. 1 through 4 operates in a different manner by keeping the rotor disc 12 stationary while axially moving the housing 14. This operation will be explained in greater detail below with reference to FIGS. 2 through 4.

Figure 2:
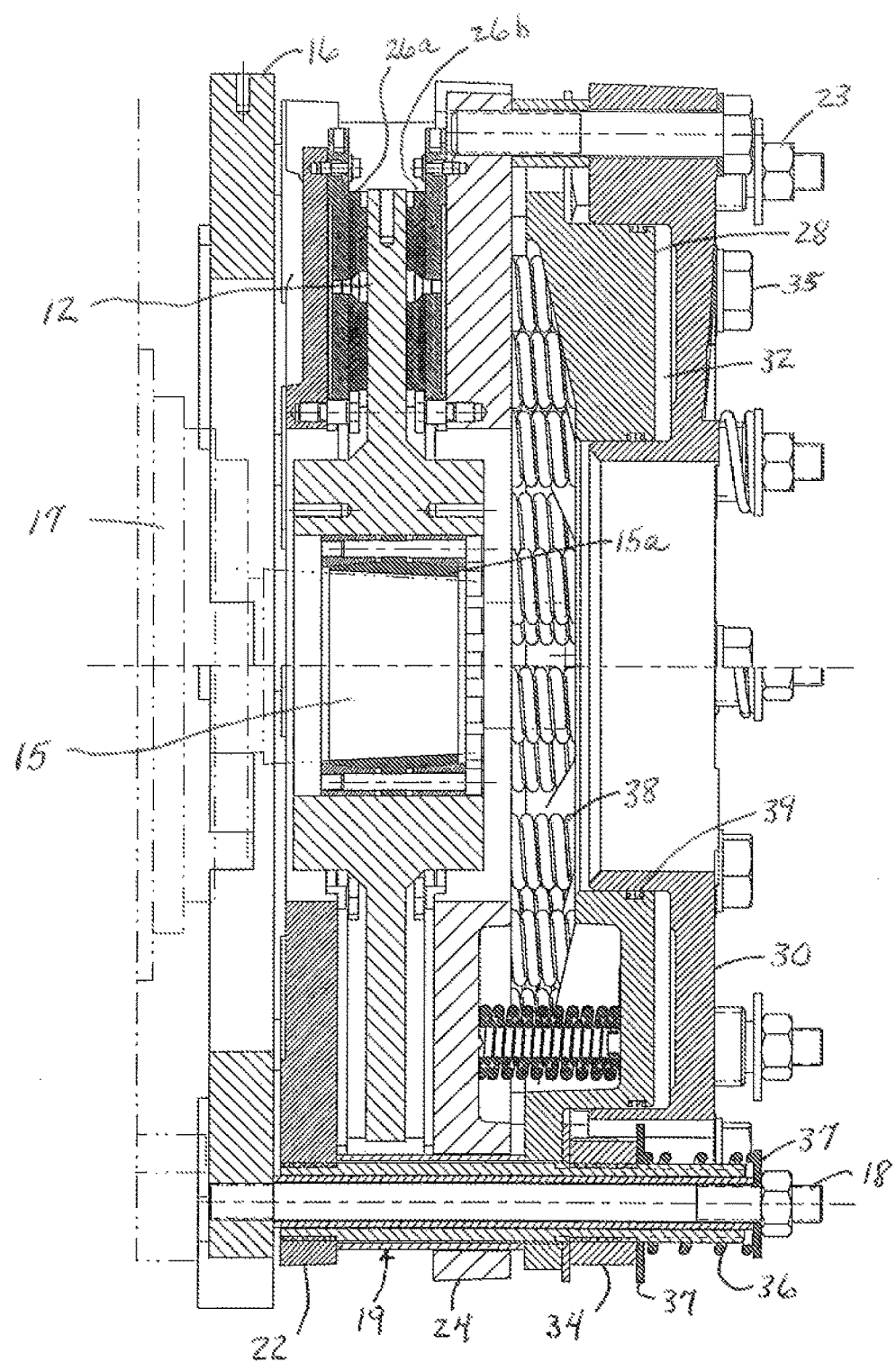
FIG. 2 is a schematic view of a portion of the assembly of FIG. 1 in an engaged condition.

FIG. 2 shows the assembly 10 in an engaged condition. In this condition, fluid is released from the fluid chamber 32 through the port (not shown) in the cylinder 30. The lack of fluid pressure in the fluid chamber 32 allows the compression springs 38 to overcome the biasing force of the release springs 36. As a result, the compression springs 38 force the pressure plate 24 to the left and the spring housing 28 to the right. The pressure plate 24 movement causes its associated friction lining 26b to contact the right face of the rotor disc 12 to generate braking action.

At the same time, the movement of the spring housing 28 toward the right allows the hollow studs 21 to pull the float plate 22 toward the right. The float plate 22 moves with the spring housing 28 by the rigid connection of the hollow studs 21 to the float plate 22 through threaded joint 27. Joint 27 may be any type of a rigid joint made by any suitable fastening means such as welding or other fasteners. The float plate 22 continues to move toward the right until its associated friction lining 26a contacts the left face of the rotor disc 12 to generate braking action. The combined braking action from the friction linings 26a, 26b on the rotor disc 12 slow and eventually stop rotation of the rotor disc 12. Note that during this entire braking process, the rotor disc 12 remains axially stationary; only the housing 14 components move axially to generate the braking action.

Figure 3:
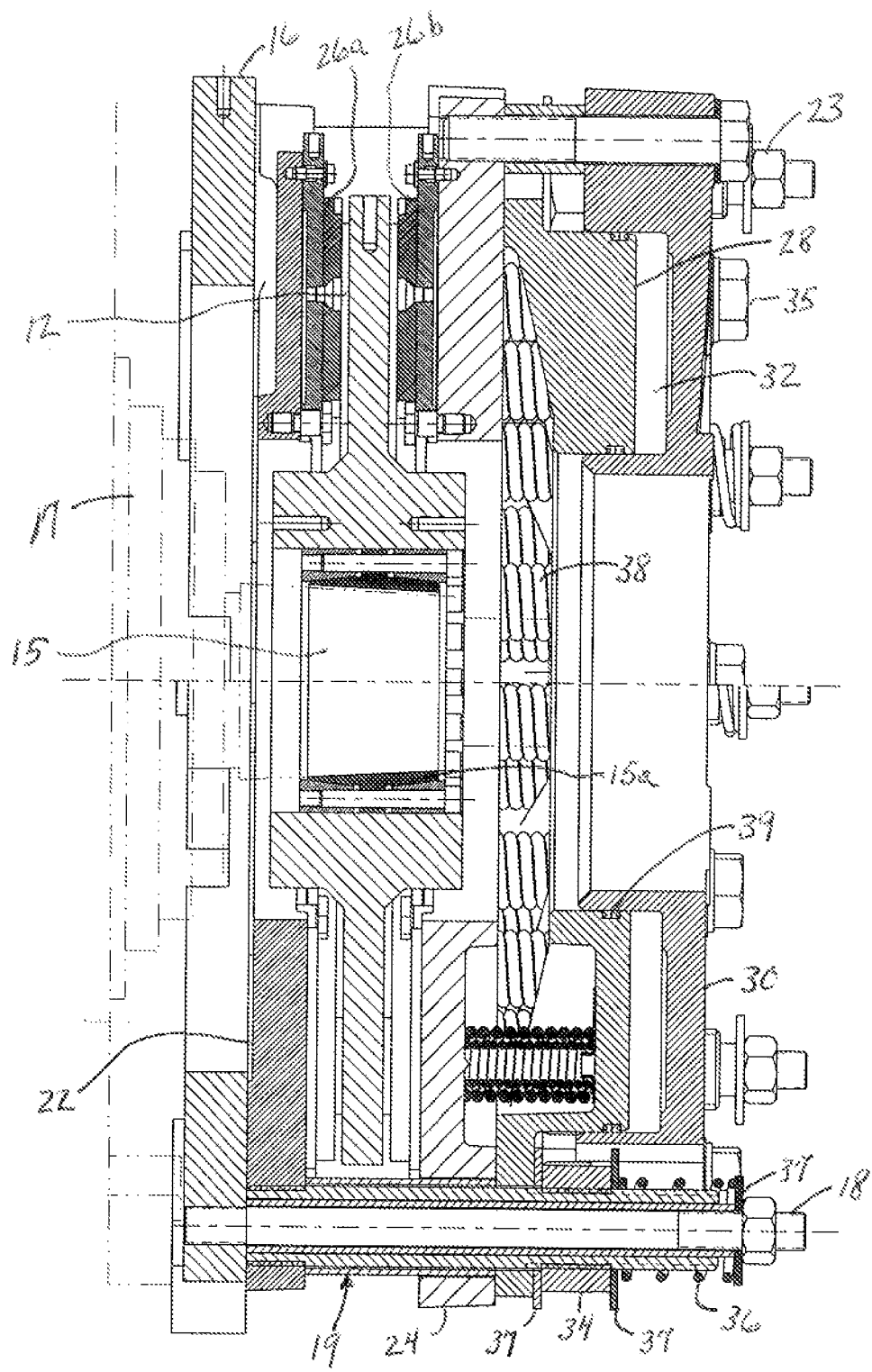
FIG. 3 is a schematic view of a portion of the assembly of FIG. 1 in a released condition.

FIG. 3 shows the assembly 10 in a released condition. To release the assembly 10, pressurized fluid enters the fluid chamber 32 through the fluid port (not shown). The fluid pressure pushes the cylinder 30 to the right, pulling the pressure plate 24 to the right as well due to the rigid attachment of the cylinder 30 to the pressure plate 24 by way of bolts 35. Moving the pressure plate 24 to the right compresses the compression springs 38 and detaches the friction lining 26b on the pressure plate 24 from the right face of the rotor disc 12.

At the same time, the pressurized fluid in the fluid chamber 32 forces the spring housing 28 to move to the left. As the spring housing 28 axially moves to the left, the hollow studs 21 and spacer clamp tubes 25 disposed between the spring housing 28 and the float plate 22 causes the float plate 22 to move to the left as well, which causes its associated friction lining 26a to detach from the left face of the rotor disc 12. The biasing force of the release spring 36 also applies pressure to the spring housing 28, further urging the float plate 22 to the left, ensuring that the friction linings 26a, 26b do not touch the rotor disc 12 in the released condition. This leaves the rotor disc 12 free to rotate unencumbered.

Note that in the released condition shown in FIG. 3, the float plate 22 movement is controlled by both the fluid pressure in the fluid chamber 32 and the biasing force from the release spring 36, while the pressure plate 24 movement is controlled solely by the fluid pressure in the fluid chamber 32. This is because the combined weight of the float plate 22, the spring housing 28, and the compression springs 38 is significantly greater than the combined weight of the cylinder 20 and the pressure plate 24. Thus, more force is needed to move the float plate 22 (and the other components attached to it) than the pressure plate 24 during the released condition. The biasing force of the release spring 36 supplements the fluid force from the fluid chamber 32 to move the float plate 22, while the pressure plate 24 is moved via fluid force alone. Accommodating for these different weights via the expansion release spring 36 allows the float plate 22 and the pressure plate 24 to separate from the rotor disc 12 at roughly the same rate.

By axially moving the housing 14 instead of the rotor disc 12 during engagement and disengagement, the brake assembly 10 described above provides a more durable and robust structure. Keeping the rotor disc 12 axially stationary in turn may assist to retain the friction linings 26a, 26b by reducing rotational inertia in the assembly 10 and eliminating the possibility of the linings 26a, 26b flying off the rotor disc 12.

Note that although the illustrated aspect shows a single rotor disc design, the assembly 10 can be modified to include additional rotor discs 12 without departing from the scope of the teachings. Moreover, although the illustrated aspect is described with respect to a braking operation, the assembly 10 can be used as a clutch without departing from the scope of the teachings.

It will be appreciated that the above teachings are merely exemplary in nature and are not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A force transmitting assembly, comprising:
    a mounting flange having a central opening to receive a shaft, wherein the mounting flange is mountable on a frame;
    a rotor disc constructed for mounting on the shaft and for rotation with the shaft, the rotor disc having a first planar face and a second planar face;
    a float plate having a first friction surface engageable with the first planar face;
    a pressure plate having a second friction surface engageable with the second planar face;
    a spring housing;
    a cylinder coupled to the spring housing, the cylinder and the spring housing forming a fluid pressure chamber, wherein the spring housing acts as a piston, wherein the spring housing moves in a first direction when pressurized fluid enters the fluid pressure chamber and the spring housing moves in a second direction when pressurized fluid exits the fluid pressure chamber;
    a plurality of first studs arranged in a circular array attached to the mounting flange;
    a plurality of tube subassemblies, each of the tube subassemblies disposed on each of the first studs to allow axial movement of at least one of the float plate, the pressure plate, and the spring housing, each of the plurality of tube subassemblies comprises a guide tube, said guide tube being disposed within a second sliding hollow stud with a portion of said second sliding hollow stud being disposed within a spacer clamp tube;
    a plurality of release springs disposed on each of the tube subassemblies;
    a plurality of first fasteners disposed at one end on each of the first studs; and
    a plurality of second fasteners disposed on each of the tube subassemblies spaced from the first fastener on each of the first studs, wherein each of the release springs is disposed between each of the first fasteners on the first studs and each of the second fasteners on the tube subassemblies.

2. The assembly of claim 1, wherein each of the release springs is disposed at one end of each of the second sliding hollow studs, the other end of each of the secondary sliding hollow studs being fastened to said float plate.

3. The assembly of claim 2, wherein each of the second fasteners is disposed on each of the second sliding hollow studs for retaining the release spring at one end, the spacer clamp tube on each of the second sliding hollow studs connect the float plate with the spring housing to prevent relative axial movement between the float plate and the spring housing.

4. The assembly of claim 1 wherein the rotor disc is axially stationary.

5. The assembly of claim 1, wherein at least one of the first and second friction surfaces comprises a friction material divided into a plurality of segments.

6. The assembly of claim 1, wherein the pressure plate is attached to the cylinder to prevent relative axial movement between the pressure plate and the cylinder.

7. The assembly of claim 1, further comprising a plurality of compression springs disposed between the pressure plate and the spring housing, wherein the plurality of compression springs bias the pressure plate away from the spring housing.

8. The assembly of claim 3, further comprising a plurality of compression springs disposed between the pressure plate and the spring housing, wherein the plurality of compression springs bias the pressure plate away from the spring housing.

9. The assembly of claim 3, wherein each of said spacer clamp tubes on each of said second sliding hollow studs is disposed between said float plate and said spring housing and are in a locked position, said pressure plate being constructed to slidably move on said spacer clamp tube.

* * * * *